R. P. & W. H. CLARK.
SPRING PROTECTOR AND SHOCK ABSORBER.
APPLICATION FILED DEC. 23, 1911.
1,032,990.
Patented July 16, 1912.
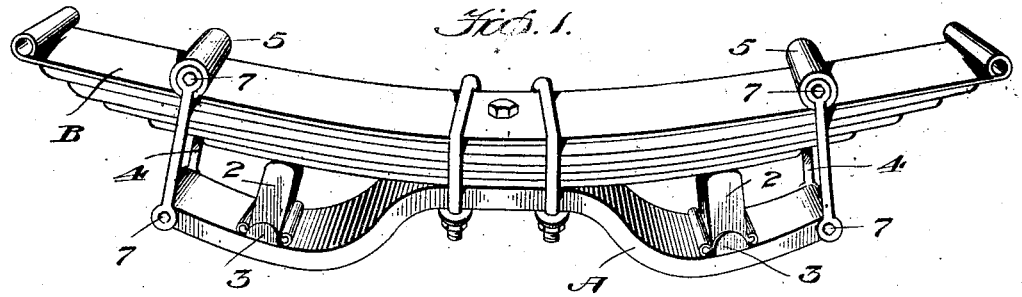
Fig. 1.
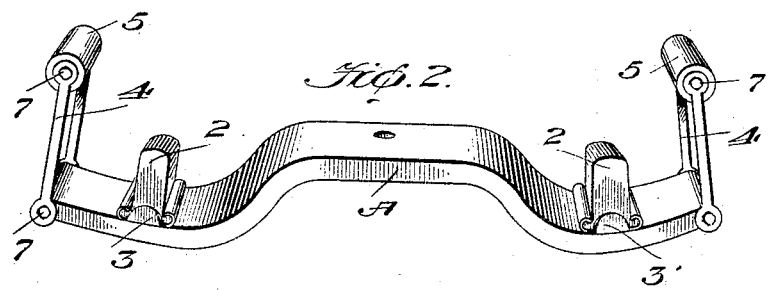
Fig. 2.
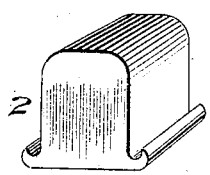
Fig. 3.
Fig. 4.
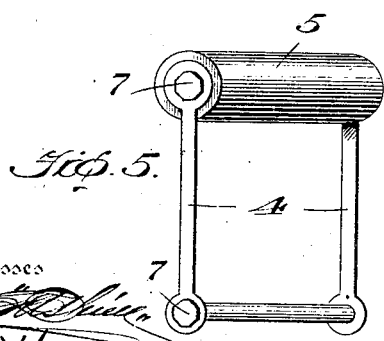
Fig. 5.
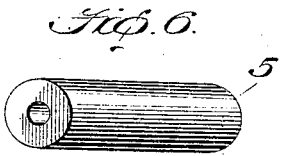
Fig. 6.
Fig. 7.
Inventors
Robert P. Clark
William H. Clark
Witnesses

UNITED STATES PATENT OFFICE.

ROBERT P. CLARK AND WILLIAM H. CLARK, OF FRESNO, CALIFORNIA.

SPRING-PROTECTOR AND SHOCK-ABSORBER.

1,032,990.  Specification of Letters Patent.  Patented July 16, 1912.

Application filed December 23, 1911. Serial No. 667,456.

*To all whom it may concern:*

Be it known that we, ROBERT P. CLARK and WILLIAM H. CLARK, citizens of the United States, residing at Fresno, in the county of Fresno and State of California, have invented certain new and useful Improvements in Spring-Protectors and Shock-Absorbers, of which the following is a specification.

Our invention relates to an improvement in spring protectors and shock absorbers, the primary object being to provide for flexibility and resiliency of action in the absorption of shocks and jolts by the use of smaller and lighter springs, and a minimum number of parts.

With these objects in view, our invention comprises a stiff bar of metal in combination with a semi-elliptic or elliptic spring made up of superimposed leaves, which bar and spring are secured to the axle in connection with links pivotally connected to the outer end of the bar and embracing the spring and carrying rubber rollers whereby the links and rollers by gravity adapt themselves to the condition of depression of the ends of the spring which results in making the rebound gradual as contradistinguished from a sudden, sharp re-action which would otherwise take place if the links were rigid and the space between their ends, in which the spring operates, were constant instead of variable due to the oscillation of the links.

Another feature of which the invention consists is in elastic bumpers arranged interjacent the bar and spring.

Our invention still further consists in certain novel features of construction and combinations of parts which will be hereinafter described and pointed out in the claims.

In the accompanying drawings:—Figure 1 is a view in perspective of our spring complete, Fig. 2 is a view of the bar, links, and bumpers, the semi-elliptic spring being removed, and Figs. 3, 4, 5, 6, and 7 are details.

A is a stiff bar of steel secured at or near its center to the axle, and B is a semi-elliptic spring held by means of clips to the bar A.

Links 4, 4, are pivotally connected with the outer ends of the bar by means of a bolt 7, and they are connected at their free ends by means of another bolt 7 on which is mounted the roller 5, which turns preferably on a bronze bushing 6, through the center of which bushing the bolt 7 passes.

The rubber bumpers 2, 2, are held by means of steel clips 3, 3, in place on the upper surface of the bar at or near the ends of the latter in position so that the spring, when not loaded, rests or bears very lightly upon these bumpers 2, 2, the object of the bumpers being to catch the jar of the spring as it goes down and prevent breakage.

In operation, the rollers 5, 5, will always clear the lowest point on the spring, so when the spring straightens out under loads or strain, the rollers will move toward the center of the spring, and when the spring rebounds the rollers will roll back toward the ends of the spring, thereby checking the rebound. This keeps the rollers in continuous motion while the spring is in use, the links carrying the rollers being caused to oscillate with the rebound of the spring. Thus the springs are confined between yielding devices at all times, namely the bumpers beneath and the rubber rollers above, for no matter how far the outer ends of the spring are depressed, the rollers maintain a rolling contact with the springs, thus gradually taking care of the re-action and excluding sudden and violent reactionary jolts which would result from links and rollers constructed so as to allow unrestrained upward vibration of the spring.

From the foregoing it will be seen that the rigid steel bar presents a perfect seat for the spring, and that in consequence a spring having less leaves can be used, and at the same time insuring greatly-reduced liability of breakage. By reason of the backward and forward movement of the links, the rollers 5, 5, work freely upon the spring, making them self-adjusting with the movement of the spring, and as stated thereby checking the rebound of the spring as it comes up.

More or less changes might be resorted to in the form and arrangement of the several parts described without departing from the spirit and scope of our invention, and hence we do not wish to be limited to the precise construction herein described, but:—

Having fully described our invention, what we claim as new and desire to secure by Letters Patent, is:—

1. In a spring protector and shock absorber, the combination with a rigid bar and a leaf spring secured centrally thereof, of links pivotally connected with the outer ends of the bar and embracing the sides of the spring and carrying rollers which bear and roll upon the upper face of the spring, and elastic bumpers interjacent the bar and spring.

2. The combination with a spring and a stiff bar of metal secured together at or near their centers, of links pivotally connected with the outer ends of the bar, and embracing the sides of the spring, an elastic roller located upon the upper surface of the spring and traveling back and forth thereon as the weight sustained by the spring rises and falls, and elastic bumpers interjacent the bar and spring.

In testimony whereof we affix our signatures, in the presence of two witnesses.

ROBERT P. CLARK.
WILLIAM H. CLARK.

Witnesses:
BENJIMEN H. LINVILLE,
JESSE R. HAYNES.